(12) United States Patent
Gustafson

(10) Patent No.: US 6,629,378 B2
(45) Date of Patent: Oct. 7, 2003

(54) CONTROLLED LIGHT SOURCE DEVICE FOR READING X-RAYS

(76) Inventor: Gregory Gustafson, 16120-46th Ave., Plymouth, MN (US) 55446

( * ) Notice: Subject to any disclaimer, the term of this patent is extended or adjusted under 35 U.S.C. 154(b) by 68 days.

(21) Appl. No.: 09/817,526

(22) Filed: Mar. 27, 2001

(65) Prior Publication Data
US 2002/0139019 A1 Oct. 3, 2002

(51) Int. Cl.[7] ............................................. G02B 27/02
(52) U.S. Cl. ...................................................... 40/361
(58) Field of Search .......................... 40/361, 362, 367, 40/471

(56) References Cited

U.S. PATENT DOCUMENTS

| | | | | |
|---|---|---|---|---|
| 4,045,896 A | * | 9/1977 | Adlon et al. | 40/367 |
| 4,510,708 A | * | 4/1985 | Pokrinchak | 40/361 |
| 4,578,887 A | * | 4/1986 | Timpe et al. | 40/361 |
| 5,159,771 A | * | 11/1992 | Ohlson | 40/361 |
| 6,119,380 A | * | 9/2000 | Inbar | 40/361 |
| 6,246,450 B1 | * | 6/2001 | Inbar | 349/5 |
| 6,279,253 B1 | * | 8/2001 | Inbar et al. | 40/361 |
| 6,311,419 B1 | * | 11/2001 | Inbar | 40/361 |

* cited by examiner

Primary Examiner—S. Joseph Morano
Assistant Examiner—Andrew Wright
(74) Attorney, Agent, or Firm—Norman P Friederichs; N Paul Friederichs

(57) ABSTRACT

A device for reading x-rays including mechanism for transporting a plurality of x-rays to and from a x-ray reading station; the transporting mechanism including a web and mechanism for securing a plurality of x-ray films to the web; the plurality of x-ray films may be spaced one from another along the web; the device including mechanism for controlling the movement of the web to sequentially transport the x-ray films to the reading station; mechanism for sensing the web and overlying x-ray film to identify the location of each x-ray film; sensing mechanism being disposed upstream of the x-ray reading station; mechanism for activating light sources behind the x-ray film and avoiding activating light sources behind the web portions not having overlying x-ray film; light activating mechanism disposed at the x-ray reading station whereby light is passed through said x-ray film and light is not passed through the web not having overlying x-ray film.

12 Claims, 3 Drawing Sheets

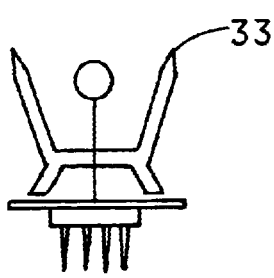
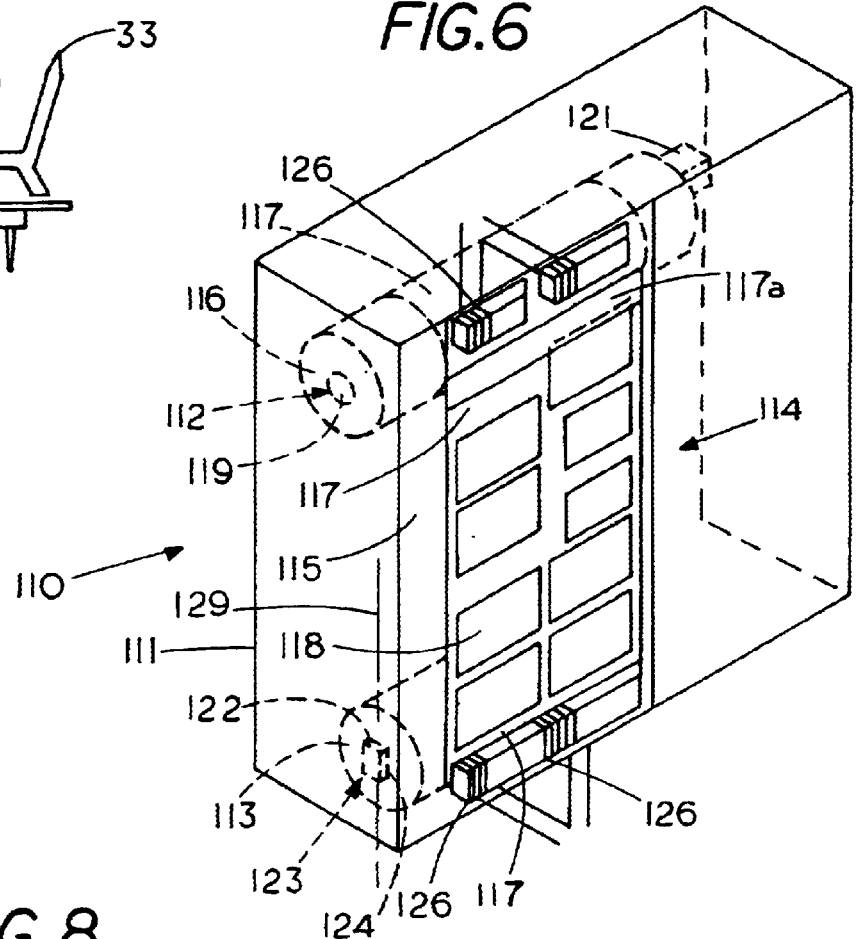
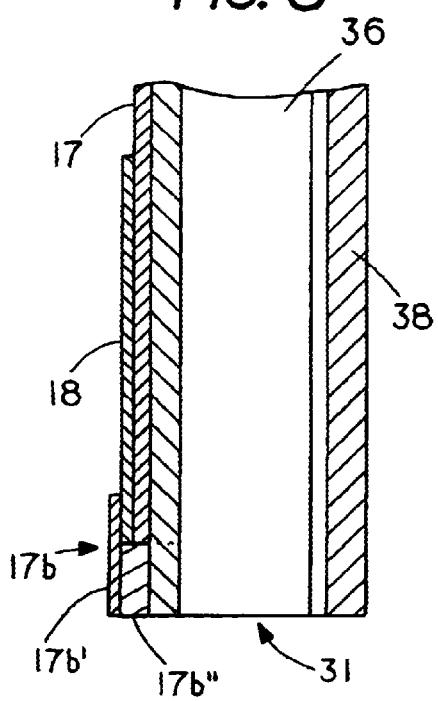
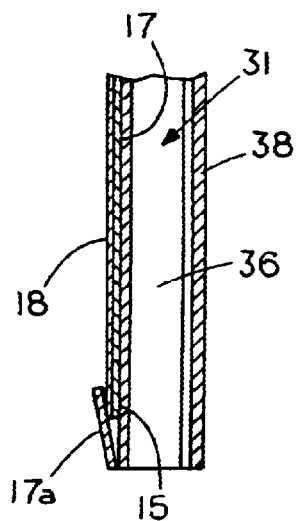

CONTROLLED LIGHT SOURCE DEVICE FOR READING X-RAYS

FIELD OF THE INVENTION

The present invention relates to devices for assisting in the reading of x-ray films and more particularly to controlling the lighting used to assist in the reading of x-ray films.

BACKGROUND OF THE INVENTION

Devices for assisting in the reading of x-rays have undergone an evolution over the history of the use of x-rays. Initially x-rays were simply held up to the light as the doctor or the technician read them. This procedure had its problems and drawbacks. The hand held x-rays tended to not be steady and the light tended to be erratic and uneven. Later, light boxes were developed light boxes consisted of a frame that held a frosted glass with a lamp disposed beneath the frosted glass. The x-ray was placed on the frosted glass where it lay in a stable position. The light box overcame the mentioned drawbacks of the hand held x-ray, but never-the-less had its own problems and drawbacks. The light box emitted a bright light in the areas around the perimeter of the x-ray and a lesser light showed through the x-ray itself. This bright light tended to partially desensitize the sight of the doctor or radiologist reviewing the x-ray.

Still later, automation came about, including carriages for transporting a series of x-rays passed a reviewing station including a light box. The x-ray transporting carriages had their own problems. One of the problems with the transporting carriages included the partial desensitizing problem previously confronted in the light boxes. Later modifications included the addition of manual or semi-automatic mechanical shutters to mask unwanted light. Such shutters are driven by hand or motorized. The present invention overcomes the partial sight desensitizing problem by only providing lighting behind the x-ray film.

The device used in many radiology departments of medical facilities is a motorized film alternator, commonly referred to as a "Rolloscope™" or "motorized viewer." This device transports radiology films for the radiologist to view and use in the generation of a report on the radiology findings. These x-ray films may consist of various widths and heights that are transported on a mechanism such as a transparent belt or web and may consist of multiple rows of x-rays, one row located adjacent another. Each row may be referred to as a deck. The area behind the belt or transport mechanism is lighted to allow the radiologist to see the image on the x-ray film. The light consists of a series of flourescent lamps covered by a white plastic panel that provides a diffused white light source. In order for the radiologist to see small findings on the film, masking may be used. The facility places black films around the area to be viewed. The black film is used as a light blocking device. Alternatively, the alternator companies offer mechanical shutters to mask e.g., block unwanted light around these films to increase viewing sensitivity. This masking is typically manual or semiautomatic and is a time consuming process, requiring careful arrangement of black film to create a desired pattern.

SUMMARY OF THE INVENTION

The present invention includes a device for assisting in the reading of radiology films, e.g., x-ray films including mechanism for transporting a plurality of x-rays to and from an x-ray reading station. The transporting mechanism may include a web and mechanism for securing a plurality of x-ray films to the web. The plurality of x-ray films may be spaced one from another along the web. The device has mechanism for controlling the movement of the web to sequentially transport the x-ray films to the reading station. The device includes mechanism for sensing the web and overlying x-ray film to identify the location of each x-ray film. The sensing mechanism is disposed upstream of the x-ray reading station. The device has mechanism for activating light sources behind the x-ray film and avoiding activating light sources behind the web portions not having overlying x-ray film. The light activating mechanism is disposed at the x-ray reading station whereby light is passed through the x-ray film and light is not passed through the web not having overlying x-ray film.

The present invention provides an area of light source that automatically conforms to dimensions of the area behind the x-ray films. The present invention includes mechanism for transporting and supporting x-ray films for reading by a doctor or radiologist. The device includes mechanism for transporting a plurality of x-ray films to and from an x-ray film reading station. The transporting mechanism includes an elongated transparent film, e.g., web for securing a plurality of x-ray films to the web. The plurality of x-ray films may be spaced one from another along the web or the x-ray films may abut one another. The mechanism for securing the x-ray films to the web may be a pocket formed along an edge of the web. Alternatively, the securing mechanism may be a clip that fastens the x-ray film to the web. The transporting mechanism e.g., web, may carry one, two or more rows of x-ray film sheets and a plurality of x-ray film sheets may be viewed simultaneously at the reading station.

The present device includes mechanism for controlling the movement of the web carrying the x-ray film to sequentially transport the individual x-ray films to the reading station. The present device includes mechanism for sensing the location of the x-ray film with respect to the web. The sensing mechanism may include a plurality of photoelectric cells to sense the presence and location of the x-ray film. The sensing mechanism is disposed upstream of the x-ray reading station. The sensing mechanism may sense the vertical dimension, as well as, the horizontal dimension of each of the x-ray films, e.g. ten inch x-ray film as distinct from twelve inch x-ray film as distinct from a seventeen inch x-ray film. The sensing mechanism also may sense the leading edge of a sheet of x-ray film and the trailing edge of the sheet of x-ray film. The information obtained by the sensing mechanism is in data form and stored for use as the web is moving to the reading station. The data then directs the light bank to illuminate only the areas which are beneath the x-ray film.

The reading station of the present device has a plurality of light sources positioned to selectively pass light through the x-ray film at the reading station to illuminate the x-ray film, without illuminating the areas of the web around the periphery of the sheets of x-ray film. The device has mechanism controlled by the sensing mechanism to activate only the light sources that pass light through the x-ray film and avoid activating the light sources that would pass light through the web that does not have overlying x-ray film. Thus light is only passed through the x-ray film and not through the layer that is solely web. This selective lighting prevents the partial desensitizing of the sight of the doctor or radiologist reading the x-rays.

The sensing mechanism reads the dimensions and location of the x-ray film, converting such information into digital data. The digital data is stored until the x-ray film reaches the reading station. The digital data then activates the light sources behind the x-ray film. The sensing mechanism serves a further purpose in that it senses the linear movement of the web so as to determine the timing of when the x-ray film is located in the reading station.

The sensing mechanism senses both the vertical dimension of the x-ray and the horizontal dimension of the x-ray. In other words the sensing mechanism recognizes the compete shadow of the x-ray film. The sensing mechanism may sense the density of the x-ray film and subsequently increase or decrease the intensity of the light directed through various areas of the x-ray to provide the desired level of light transmitted through the x-ray films.

As the x-ray films pass through the film detection scanners the location, size and if desired shape of the x-rays films are scanned into digital form, entered into a computer shift register in digital data form and synchronized with the encoder to provide the illuminate light directly behind the films and not to the bare web. Software allows tracking of films in alternative directions, e.g., for right and left movement.

The present invention also includes a method for reading x-ray films. The method includes passing a plurality of x-ray films through a film detection scanner; sensing the size, location, and if desired shape, of each of the x-ray films; entering the sensed information of each of the x-ray films into a computer shift register; transmitting the sensed information of the x-ray films to a light bank to provide illumination solely and directly behind each of the x-ray films upon movement of the x-ray films to a reading position in front of the light bank. The method may include the step of disabling the light bank during the movement of the x-ray film. The method may include the step of selectively dimming the light source to adjust for variation of density of the x-ray film. The method may include the step of selectively dimming the light source including selectively dimming the light source applied to an individual x-ray film to avoid hot spots or hot light. The method of the present invention may include movement of x-ray film with either direction, e.g., rightward movement or leftward movement. The method of the present invention may include the step of selectively increasing the intensity of the light to increase the light passing through a selected portion of an x-ray film to assist in reading a portion of the x-ray film.

IN THE DRAWINGS

FIG. 5 is a sectional view of a lamp and light reflector taken along the line V—V in FIG. 3;.

FIG. 6 is a schematic perspective view of a second embodiment of the present invention;

FIG. 7 is a sectional view taken along the line VII—VII in FIG. 1;

FIG. 8 is a sectional view of an alternative web support.

DETAILED DESCRIPTION OF THE PREFERRED EMBODIMENT

Figure 1:
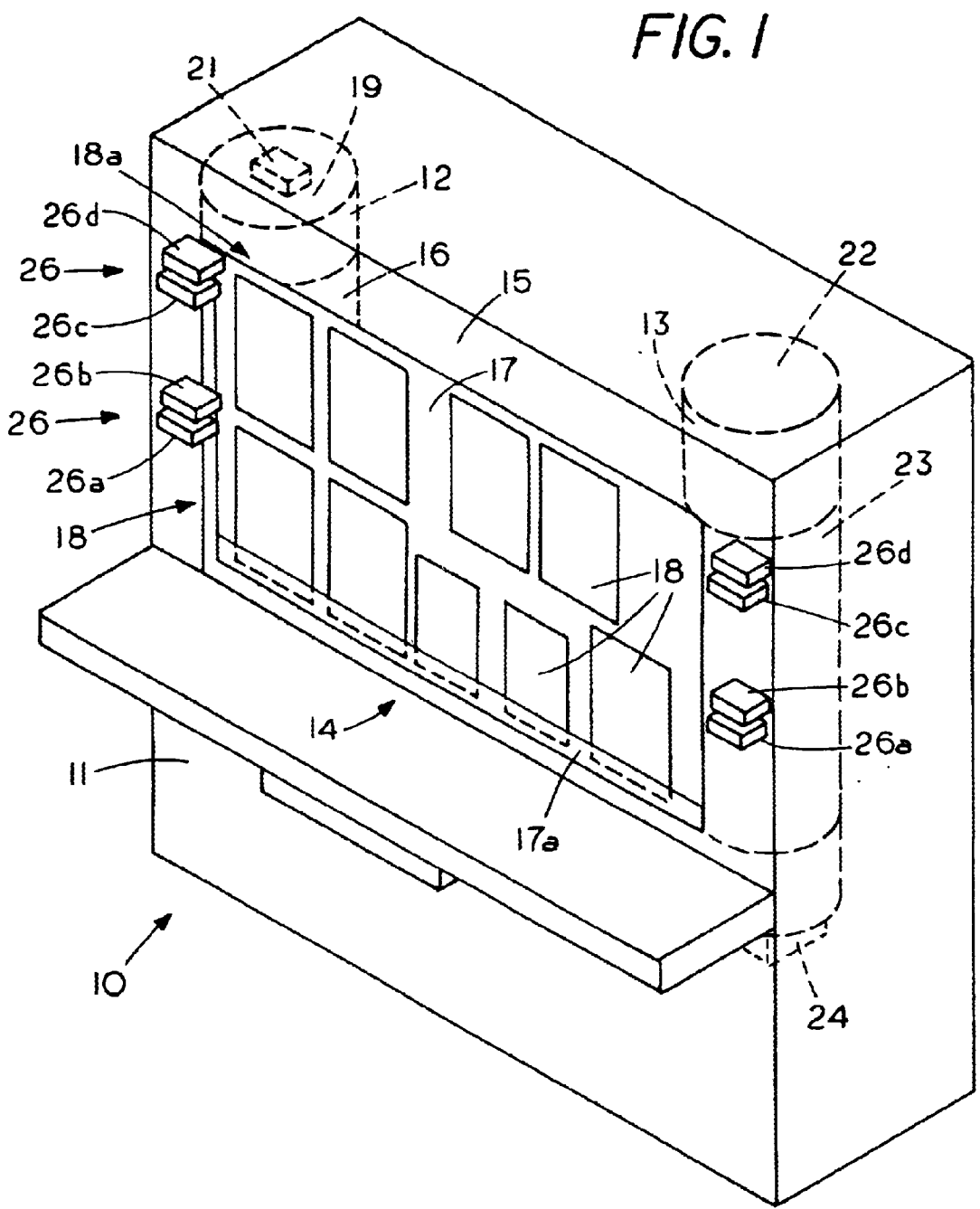
FIG. 1 is a schematic perspective view of the present invention.

The present controlled light source device 10 (FIG. 1) for reading x-ray film may include a frame 11 supporting a first roll support 12, a second roll support 13 and an x-ray reading station 14 including an etched polymer sheet 15, e.g., etched Plexiglass™. The frame 11 may be of any suitable construction, typically of angle iron and steel sheeting materials or of polymeric construction. The first roll support 12 is adapted to carry a roll 16 of a composite of web 17 and a plurality of sheets of x-ray film 18.

The web 17 may include a trough 17a (FIG. 7) that serves to trap the lower edge of the x-ray film adjacent the principal portion 17b of the web 17. The trough 17a may be formed merely by folding a lower portion of the web 17 as shown in FIG. 7. The web 17 may be of any suitable transparent polymer sheet such as polyethylene or polypropylene, for example having a thickness and strength sufficient to support the x-ray film 18. The web 17 rides along against the etched polymer sheet 15. An alternative support is trough 17c is shown in FIG. 8. The trough 17c has a strip 17c' that is secured to web 17 by a two sided adhesive strip 17c". The adhesive strip 17c" serves to space the strip 17c' from web 17 sufficient to permit the x-ray film 18 in the slot 17c'''. Any suitable mechanism may be used to hold the x-ray films adjacent the web 17. For example, a pocket or a clamp may be used to secure an edge of the x-ray film to the web. Alternatively, a line or filament may be used wherein the line is stretched along the web x-ray composite 17/18.

The first roll support 12 (FIG. 1) may be in the form of a power driven shaft 19. The roll 16 of the web 17 and x-ray film 18 may be mounted for use by placement over the driven shaft 19. The shaft 19 may be controlled by a power mechanism such as a small electric motor 21 to either permit controlled withdrawing, e.g., stripping of the composite 17/18 from the roll 16 or to provide powered wrapping of the composite 17/18 onto the roll 16.

The second roll support 13 may be in the form of a power driven shaft 22 to support the second roll 23 of the web 17. The shaft 22 may be driven by power mechanism such as a small electric motor 24. The shaft 22 serves during normal operation to strip the composite of web 17 and x-ray film sheets 18 from roll 16 and wrap the composite 17/18 onto roll 23. The operation of power driven shafts 19 and 22 may be reversed so that the composite of web 17 and x-ray film sheets 18 are stripped from roll 23 and wrapped onto roll 16. This permits the doctor or 20 radiologist to review again a x-ray film that has already passed the reading station by return of the x-ray film to the reading station 14.

The device 10 includes sensing mechanism 26 that serves to scan the composite of the web 17 and x-ray film 18. The sensing mechanism 26 may include a plurality of individual sensors 26a, 26b, 26c, and 26d. The sensing mechanism 26 is disposed downstream of the roll 16 and upstream of the reading station 14. The sensing mechanism 26 may be a plurality of photoelectric cells operated on any of various principles such as reflective light or a system in which the amount of light passing through the composite is measured. One suitable system is the product available from Banner Engineering Corp. of Minneapolis, Minn. under the designation MINI-BEAM EXPERT™. Suitable photoelectric cells are described in U.S. Pat. Nos. 4,356,393 and 5,808,256.

The individual sensors 26a–26d may be positioned to read the presence of the x-ray film in the path leading from the roll 16 to the reading station 14. The sensor 26a may be placed in a lower location to read the leading edge of the x-ray film and the trailing edge of the x-ray film.

The sensor 26a compiles data defining where an x-ray film 18 begins and ends in the supported position on the web.

The sensor 26b is in a partially elevated position to distinguish between short x-ray film 18 having a vertical dimension of perhaps 10 inches and x-ray film 18 having a vertical dimension greater than 10 inches. The sensor 26b for example may be placed slightly more than 10 inches from the zero line, e.g., bottom line of the supported x-ray film 18.

The device 10, if desired, may include a web 17 adapted to carry a plurality of vertically spaced rows e.g., decks 18 and 18a of x-ray films. While the device 10 is shown with two decks 18 and 18a, the device 10 may have a single deck or there may be more than two decks. The sensor 26c may be placed at a location to sense the leading edge and the trailing edge of the upper row of x-ray films 18a. The sensor 26d is placed slightly more than 10 inches from the zero line of the upper row of x-ray film 18a on the web 17.

Figure 2:
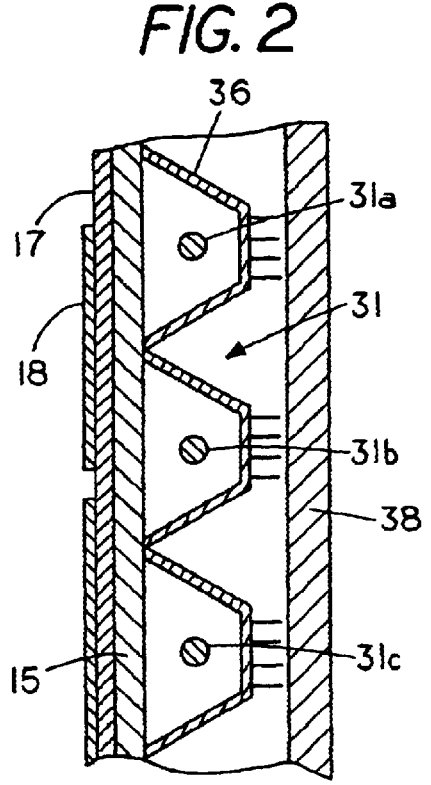
FIG. 2 is a sectional view of the reading station taken along the line II—II in FIG. 1.
Figure 3:
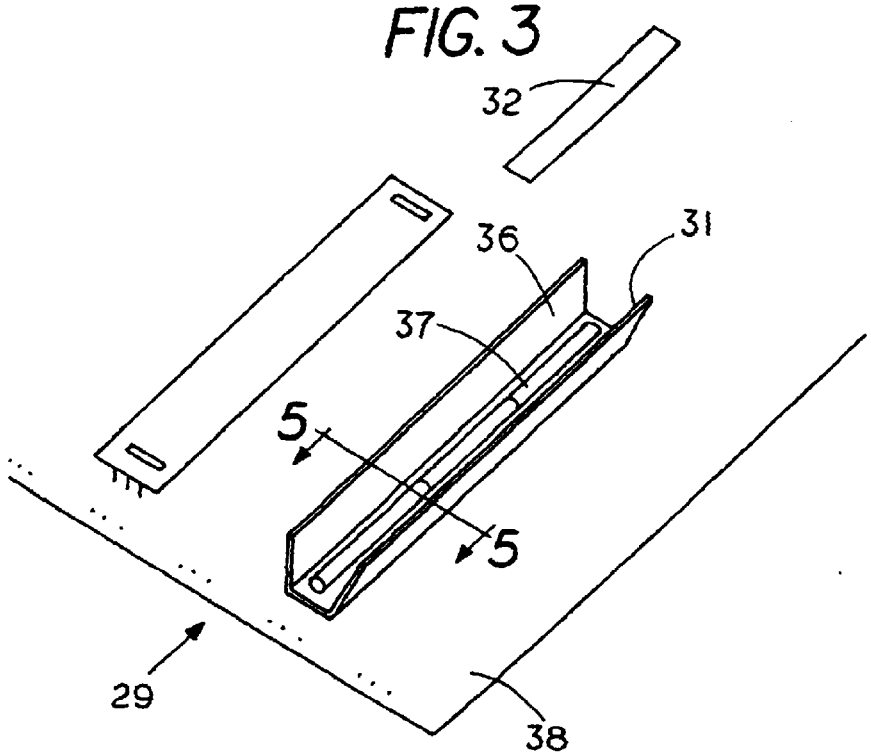
FIG. 3 is a view of the lamps and mother board.

The reading station 14 (FIGS. 2 and 3) may include a sheet of thick etched polymer 15. The polymer sheet 15 serves to support the composite of web 17 and x-ray film sheets 18. The polymer sheet 15 may be supported by the frame 11 in a position that provides proper orientation for the reading of the x-ray film 18 by the doctor or radiologist. A lighting bank 29 is disposed to the rear of the polymer sheet 15 to illuminate the x-ray film sheet 18 at the reading station 14. The lighting bank 29 includes a plurality of sets of lamps, such as lamps 31, 32. The lamp set 31 is adapted to illuminate x-ray film 18 that is the shortest set, e.g., 10 inches in vertical dimension. The Light set 32 is adapted to illuminate, in combination with light set 31, the x-ray film sheets 18 that are 12 inches in vertical dimension.

Figure 4:
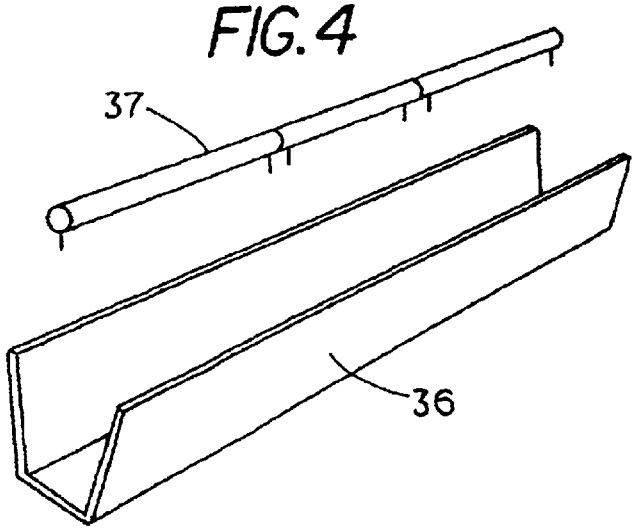
FIG. 4 is an exploded view of a light reflector and lamp.

Light set 31 includes a plurality of vertically oriented lamps 31a–31h. The lamps 31a–31h may be identical in construction and includes a reflector support 36 in which a lamp 37 is supported. The reflector support 36 may be channel shaped as shown in FIG. 4. The lamp 37 may be a string lamp of the type available from JKL Lamps, Inc. of California under the designation CCFC (Cold cathode flourescent). The lamps are of the type used in lap top computer screens. Typically such lights or lamps will be 3 mm in diameter and may be of any desired length The combination of the support 36 and lamp 37 is mounted on a mother board 38. The support 36 may be constructed of polymer and formed in the desired shape such as by vacuum molding.

Light set 32 may be similar in construction to light set 31, however, light set 32 is only 2 inches in length and includes a plurality of vertically oriented lamps 32a–32h. The lamps 32a–32h may be identical in construction to the lamps 31a–31h except for length. The lamps 32a–32h are mounted on the mother board 38 as described with respect to lamps 31a–31h.

DETAILED DESCRIPTION OF THE SECOND PREFERRED EMBODIMENT

The second embodiment of the present controlled light source device 110 (FIG. 6) for reading x-ray film may include a frame 111 supporting a first roll support 112, a second roll support 113 and an x-ray reading station 114. The frame 111 may be of any suitable construction. The first roll support 112 is horizontally supported and is adapted to carry a horizontal roll 116 of a composite of web 117 and a plurality of sheets of x-ray film 118. The web 117 may be of any suitable transparent polymer sheet material having sufficient strength and integrity to carry and transport the x-ray film 118. Any suitable mechanism may be used to hold the x-ray films adjacent the web. For example, a trough 117a may extend along one edge of the web/x-ray composite 117/118. The second preferred embodiment 110 of the present invention thus may be similar in construction to the first embodiment 10 except the orientation of the rolls 112, 113 and web 117 are for vertical movement of the web in contrast to the horizontal movement in the first embodiment 10.

The first roll support 112 may be in the form of a shaft 119 driven by an electric motor 121. The roll 116 of the web 117 may be mounted for use by placement over the driven shaft 119. The shaft 119 may be controlled by the small electric motor 121 to either permit controlled stripping of the composite 117/118 from the roll 116 or to provide powered wrapping of the composite 117/118 onto the roll 116.

The second roll support 113 may be in the form of a shaft 122 driven by an electric motor 124 to support the second roll 123 of the web 117. The shaft 122 serves during normal operation as to strip the composite of web 117 and x-ray film sheets 118 from roll 116 and wrap the composite 117/118 onto roll 123. The operation of power driven shafts 119 and 122 may be reversed so that the composite of web 117 and x-ray film sheets 118 are stripped from roll 123 and wrapped onto roll 116. This permits the doctor or radiologist to again study an x-ray film that has already passed the reading station 114 by return of the x-ray film to the reading station.

The device 110 includes sensing mechanism 126 that serves to scan the composite of the web 117 and x-ray film 118. The sensing mechanism 126 is a strip sensor and may include a plurality of individual sensors forming the elongated strip that senses the entire length and breadth of the x-ray film 118. The sensing mechanism 126 is disposed downstream of the roll 116 and upstream of the reading station 114. The sensing mechanism 126 may be a plurality of photoelectric cells operated on any of various principles such as reflective light or a system in which the amount of light passing through the composite 117/118 is measured. Suitable photoelectric cells or sensors 126 are described in U.S. Pat. Nos. 4,356,393 and 5,808,256. The individual sensors 126 may be positioned to read the presence of the x-ray film in the path leading from the roll 116 to the reading station 114. The sensor 126 may be placed in a location to read the leading edge of the x-ray film and the trailing edge of the x-ray film along with film height. The sensor 126a compiles data defining where an x-ray film 118 begins and ends in the supported position on the web 117.

The device 110, if desired, may include a web 117 adapted to carry a plurality of spaced decks of x-ray films 118 and 118a. While the device 110 is shown with two decks, the device 110 may have a single deck 118 or there may be more than two decks. The sensor 126c may be placed at a location to sense the leading edge 118' and the trailing edge 118" of the upper row of x-ray films 118a.

The reading station 114 may include a sheet of thick etched polymer 115. The polymer sheet 115 forms a path that serves to support the composite of web 117 and x-ray film sheets 118. The polymer sheet 115 may be supported by the frame 111 in a position that provides proper orientation for the reading of the x-ray film 118 by the doctor or radiologist. A lighting bank 129 is disposed to the rear of the polymer sheet 115 to illuminate the x-ray film sheet 118 at the reading station 114. The lighting bank 129 includes a plurality of sets of lamps, such as lamps 131, 132. The light set 131 is adapted to illuminate x-ray film 118 that is the shortest set, e.g., 10 inches in vertical dimension. The light set 132 is adapted to illuminate, in combination with light set 131, the x-ray film sheets 118 that are, for example, 12 inches in vertical dimension.

Light set 131 includes a plurality of vertically oriented lamps 131a-131h. The lamps 131a-131h may be identical in construction and includes a reflector support 136 in which a lamp 137 is supported. The reflector support 136 may be channel shaped as shown in FIG. 4. The lamp 137 may be a string lamp or light of the type available from JKL lamps, Inc. of California under the designation CCFC (Cold cathode flourescent). Support 136 and lamp 137 is mounted on a mother board 138. The support 136 may be constructed of polymer such as by vacuum molding.

Lamp set 132 may be similar in construction to light set 131, however, light set 132 is only 2 inches in length and includes a plurality of vertically oriented lamps 132a-132h. The lamps 132a-132h may be identical in construction to the lamps 131a-131h except for length.

The lamps 132a–132h are mounted on the mother board 138 as described with respect to lamps 131a–131h.

Various modifications can be made to the device 110, for example, the elongated film 117 may be adapted to carry more than two rows of x-ray films. Further, the device 110 may be adapted to carry over sized sheets of x-ray film that may over lie the two rows of the web.

What is claimed is:

1. A device for reading x-rays, said device comprising:

an x-ray reading station;

a plurality of x-ray films;

means for transporting the plurality of x-rays to and from the x-ray reading station; the transporting means including a web and means for securing the plurality of x-ray films to the web, the plurality of x-ray films being spaced from another along the web;

means for controlling the movement of the transporting means to sequentially transport the x-ray films to the reading station;

means for sensing the web and overlying x-ray film to identify the location of each x-ray film, the sensing means being disposed upstream of the x-ray reading station; and means for activating light sources behind the x-ray film and avoiding activating light sources behind the web portions not having overlying x-ray film, the sensing means being in operable communication with the light activating means, the light activating means not being a mask, the light activating means being disposed at the x-ray reading station whereby light is passed through the x-ray film and light is not passed through the web not having overlying x-ray film.

2. The x-ray reading device of claim 1 wherein the sensing means comprises:

means for generating digital data defining the area of each of the x-ray films.

3. The x-ray reading device of claim 2 further comprising:

means for storing the digital data and means for activating the light activating means.

4. A method for reading x-ray films, the method comprising:

passing a plurality of x-ray films through a film detection scanner;

sensing the size and location of each of the x-ray films;

entering the sensed size and location of each of the x-ray films into a computer shift register; and electronically transmitting the sensed size and location of the x-ray films to a light bank to provide illumination solely and directly behind each of the x-ray films without the use of a mask and upon movement of the x-ray films to a reading position in front of the light bank.

5. The method of claim 4 further including the step of:

disabling the light bank during the movement of the x-ray.

6. The method of claim 5 further including the step of:

selectively dimming the light source to adjust for variation of density of the x-ray film.

7. The method of claim 6 wherein the step of selectively dimming the light source further includes the step of:

selectively dimming the light source applied to individual x-ray film to create hot light.

8. A device for reading radiology film, comprising:

a radiology film reading station;

a plurality of radiology films;

means for transporting the plurality of radiology films to and from the radiology film reading station, the transporting means including a web and means for securing the plurality of radiology films to the web; the plurality of radiology films being spaced one from another along the web;

means for controlling the movement of the web to sequentially transport the radiology films to the reading station;

means for sensing the web and overlying radiology film to identify the location of each radiology film; sensing means being disposed upstream of the radiology firm reading station; and means for activating light sources behind the radiology film and avoiding activating light sources behind the web portions not having overlying radiology film; the sensing means being in operable communication with the light activating means, the light activating means not being a mask, light activating means disposed at the radiology film reading station whereby light is passed through the radiology film and light is not passed through the web not having overlying radiology film.

9. The radiology film reading device of claim 8 wherein the sensing means comprises:

means for generating digital data defining the area of each of the radiology films.

10. The radiology film reading device of claim 8 wherein the device comprises:

means for storing the digital data and means for activating the light activation means.

11. The radiology film reading device of claim 10 further comprising:

a plurality of decks on the web.

12. A device for reading x-ray films, the device comprising:

means for passing a plurality of x-ray films through a film detection scanner;

means for sensing the size and location of each of the x-ray films;

means for entering the sensed size and location of each of the x-ray films into a computer shift register; and means for transmitting the sensed size and location of the x-ray films to a light bank to provide illumination solely and directly behind each of the x-ray films without masks upon movement of the x-ray films to a reading position in front of the light bank.

* * * * *